(12) United States Patent
Metzler et al.

(10) Patent No.: US 11,948,286 B2
(45) Date of Patent: Apr. 2, 2024

(54) DARK IMAGE ENHANCEMENT

(71) Applicant: LEICA GEOSYSTEMS AG, Heerbrugg (CH)

(72) Inventors: Bernhard Metzler, Dornbirn (AT); Harald Vennegeerts, Berlin (DE); Aldo Facchin, Azzano Decimo (IT)

(73) Assignee: LEICA GEOSYSTEMS AG, Heerbrugg (CH)

( * ) Notice: Subject to any disclaimer, the term of this patent is extended or adjusted under 35 U.S.C. 154(b) by 256 days.

(21) Appl. No.: 17/379,664

(22) Filed: Jul. 19, 2021

(65) Prior Publication Data

US 2022/0020131 A1 Jan. 20, 2022

(30) Foreign Application Priority Data

Jul. 20, 2020 (EP) .................................... 20186772

(51) Int. Cl.
*G06K 9/00* (2022.01)
*G06T 3/4046* (2024.01)
(Continued)

(52) U.S. Cl.
CPC .............. *G06T 5/50* (2013.01); *G06T 3/4046* (2013.01); *G06T 5/003* (2013.01); *G06T 5/006* (2013.01);
(Continued)

(58) Field of Classification Search
CPC ......... G06T 5/50; G06T 3/4046; G06T 5/003; G06T 5/006; G06T 5/40; G06T 7/70; G06T 2207/10024; G06T 2207/20084; G06T 2207/20221; G06T 5/009; G06T 2207/10028; G06T 2207/10044; G06T 2207/20081; G06T 7/11; G06T 2207/30244; G06T 7/0002; G06T 2207/30196; G01S 17/89; G06N 3/08;
(Continued)

(56) References Cited

U.S. PATENT DOCUMENTS

| 9,595,084 | B2 | 3/2017 | Houjou et al. |
| 2014/0320602 | A1 | 10/2014 | Govindarao et al. |
| 2016/0117800 | A1 | 4/2016 | Korkin |
| 2020/0160459 | A1 | 5/2020 | Coolidge et al. |

(Continued)

FOREIGN PATENT DOCUMENTS

| EP | 15176238 | 1/2017 |
| JP | 2019-048117 A | 3/2019 |

OTHER PUBLICATIONS

M. Purohit, A. Chakraborty, A. Kumar and B. K. Kaushik, "Image Processing Framework for Performance Enhancement of Low-Light Image Sensors," in IEEE Sensors Journal, vol. 21, No. 6, pp. 8530-8542, 15 Mar. 15, 2021 (Year: 2021).*

(Continued)

*Primary Examiner* — Alex Kok S Liew
(74) *Attorney, Agent, or Firm* — Maschoff Brennan

(57) ABSTRACT

The invention relates to a method for enhancing images for metrological applications. The method comprises the steps: 1) providing a geometric correction image having an image geometric correctness higher than the processed image geometric correctness and showing at least a part of the scene of interest, and 2) at least partially reducing the loss of initial metrological information in the distorted metrological information by fusing the enhanced image with the geometric correction image.

15 Claims, 3 Drawing Sheets

(51) Int. Cl.
*G06T 5/00* (2006.01)
*G06T 5/40* (2006.01)
*G06T 5/50* (2006.01)
*G06T 7/70* (2017.01)
*G01S 17/89* (2020.01)

(52) U.S. Cl.
CPC ................. *G06T 5/40* (2013.01); *G06T 7/70* (2017.01); *G01S 17/89* (2013.01); *G06T 2207/10024* (2013.01); *G06T 2207/20084* (2013.01); *G06T 2207/20221* (2013.01)

(58) Field of Classification Search
CPC .......... G06N 3/045; G06N 3/04; G06N 3/063; G06N 3/084; G06N 3/047; G06N 3/048; G06N 3/044; G06N 20/20; G06N 7/01; G06N 20/00; G06N 3/02; G06N 3/082; G06N 20/10; G06N 3/0455; G06N 3/0464; G06N 3/0475; G06N 3/088; G06N 3/0895; G06N 5/01; G06N 5/046; G06N 3/065; G06N 3/067; G06N 3/094; G06N 3/126
See application file for complete search history.

(56) References Cited

U.S. PATENT DOCUMENTS

2020/0174130 A1  6/2020  Banerjee et al.
2022/0020178 A1* 1/2022  Metzler .................... G06T 7/97

OTHER PUBLICATIONS

Kwan, et al., "Further Improvement of Debayering Performance of RGBW Color Filter Arrays Using Deep Learning and Pansharpening Techniques," Journal of Imaging, vol. 5, Issue 8, pp. 1-14 (Aug. 8, 2019).

Lin Mengchen, et al., "Deep Single Image Enhancer," 16th IEEE International Conference on Advanced Video and Signal Based Surveillance (AVSS), pp. 1-7 (Sep. 18, 2019).

Huang, et al., "Enhancing object detection in the dark using U-Net based restoration moduler," 16th IEEE International Conference on Advanced Video and Signal Based Surveillance (AVSS), IEEE, pp. 1-9 (Sep. 18, 2019).

Extended European Search Report dated Dec. 23, 2020 as received in Application No. 20186772.8.

Chen et al. (Chen, C., Chen, Q., Xu, J., & Koltun, V. (2018). Learning to see in the dark. In Proceedings of the IEEE Conference on Computer Vision and Pattern Recognition (pp. 3291-3300).

Chen, C., Chen, Q., Do, M. N., & Koltun, V. (2019). Seeing motion in the dark. In Proceedings of the IEEE International Conference on Computer Vision (pp. 3185-3194)).

Huang, Yen-Ting, et al., "Enhancing object detection in the dark using U-Net based restoration module," 2019 16th IEEE International Conference on Advanced Video and Signal Based Surveillance (AVSS), pp. 1-8 (Nov. 25, 2019).

Lin, Mengchen, et al., "Deep Single Image Enhancer," 2019 16th IEEE International Conference on Advanced Video and Signal Based Surveillance (AVSS), pp. 1-7 (Nov. 25, 2019).

* cited by examiner

DARK IMAGE ENHANCEMENT

BACKGROUND

The present invention relates to a method, computer program product and system according to the preambles of the independent claims.

Images perceived to be dark by the human eye are often acquired in dim or in quickly changing environments, wherein quick changes might arise from fast camera movement. In the second case, short exposure times of the camera taking an image might be necessary to avoid blurry images; the short exposure time, however, leads to images perceived to be dark by a human observer. Such dark images may additionally comprise a significant amount of noise. It may therefore be beneficial to improve the dark image prior to further processing, e.g. to enable a human observer to identify objects in the image and to infer metrological information from the identified objects. For a low signal-to-noise ratio (SNR) of the image, algorithms used for enhancing the image are preferentially non-linear, as the non-linearity may help to separate signal from noise and selectively amplify only the signal.

Images are typically presented to a human observer and/or to a machine. A human observer and/or a machine extracts information from the images. EP15176238 provides an example of image-based metrology. The extracted information is often spatial in nature and pertains e.g. to distance information or relative locations of two objects to one another.

For the triangulation of an object, for example, two images of said object may be used to infer the spatial position of the object. Knowing the base distance between the camera(s) providing the two images, corresponding features in the two images, a feature being for example a corner of the object, may be detected and used for determining the 3D position of the part of the object corresponding to the detected corresponding features. Triangulation using corresponding features requires a precise determination of features in the two images. If the detected features were for example shifted away from their true position in the two images, the object would not be triangulated correctly.

Feature detection accuracy is typically dependent on the SNR of the analyzed image. Images acquired in dim or in quickly changing environments are often characterized by a low SNR. For such images, feature detection would produce many mistakes, and subsequent triangulation using partly faulty features would provide wrong 3D positions of triangulated objects. Images with a low SNR may therefore need to be enhanced prior to further processing.

In terrestrial laser scanning applications or mobile mapping applications, for example, point cloud data acquired by a laser scanner may be colored using color images provided by a color resolving camera. If the color images are acquired in dim or in quickly changing environments, the resulting color images are often characterized by a low SNR. As measurements in the colored point cloud typically depend on the colors of the colored point cloud, it may be necessary to enhance the color images prior to coloring the point cloud to improve subsequent measurement in the colored point cloud. A user may also select individual points or regions in the colored point cloud depending on the color information, for example for further inspection. It may also be necessary to improve a color fidelity (corresponding to white balancing) and/or to make colors more vivid prior to coloring the point cloud, for example.

Vividness of a color may be defined in a hue-saturation-lightness (HSL) color space, for example. The vividness may be measured using the saturation component. A color becomes more vivid if moving out from the center of a HSL cylinder to the edge of the HSL cylinder, for example.

Properties such as the position of edges or corners of an object in an image should ideally be maintained after image enhancement, i.e. the position of edges or corners of an object in an image should ideally be the same both before and after image enhancement. Since the mentioned properties may subsequently be used for triangulation, for example, the mentioned properties to be maintained are metrological properties. For metrological applications, contours of objects in images or similar details should ideally be maintained after image enhancement, for a determination of metrological information from images typically requires information encoded by contours of objects or similar details in images.

Mapping urban environments as an example of a metrological application can be done using a mobile mapping platform, for example a car-based mapping platform. The aim of mapping urban environments is to obtain a dense 3D reconstruction of houses, trees, road assets and other at least temporally stationary objects in cities. A car used for mapping an urban environment may be equipped with a Lidar and cameras, for example. The pixels of an image sensor of the camera typically correspond to square areas having side lengths in the sub-centimeter range. Structures in an urban environment in the sub-centimeter range are therefore typically mapped onto one pixel. The car may drive through narrow streets lined by tall buildings blocking direct sunlight, leading to a dim environment particularly before or after peak daylight conditions. Car-based mapping systems are typically moving with speeds between 10 to 30 meters per second. The combination of dim urban environments and required short exposure times—to avoid blurry images due to the movement of the car—leads to low SNR images, the low SNR images being dark. Similar considerations about dim environments often apply to indoor environments, too.

Static mapping of an environment as an example of a metrological application may also be impacted by a dim or quickly changing environment. For the case of a terrestrial laser scanner equipped with a color resolving camera, the provided color images may be noisy and have low SNR.

Brightness enhancement of dark images is a well-studied problem. Recently, two publications by Chen et al. (Chen, C., Chen, Q., Xu, J., & Koltun, V. (2018). Learning to see in the dark. In *Proceedings of the IEEE Conference on Computer Vision and Pattern Recognition* (pp. 3291-3300) and Chen, C., Chen, Q., Do, M. N., & Koltun, V. (2019). Seeing motion in the dark. In *Proceedings of the IEEE International Conference on Computer Vision* (pp. 3185-3194)) have studied the problem of enhancing dark images. The first of the two papers proposes a technique for enhancing single images, while the second of the two papers provides a technique for enhancing videos. Both papers utilize deep learning methods, i.e. input/output training data comprising dark images and corresponding bright ground truth images are used for learning a mapping from a dark image to an enhanced bright image. Due to the nonlinearity and the use of prior knowledge encoded in the learned convolutional neural network, the SNR of an enhanced bright image is typically improved compared to the dark images provided to the convolutional neural network for enhancement. The techniques studied in the two papers by Chen et al. do not take metrological properties of the images into account, i.e.

the algorithm is explicitly designed to only enhance an input image without any relation to or consideration of metrology.

Deep learning methods may also be used for reducing noise if applied to a noisy image, or to increase resolution of an image, or to improve color fidelity of an image, or to transform colors of an image to more vivid colors. A neural network may also be trained to provide a combination of the mentioned functionalities, i.e. it may jointly increase resolution and improve brightness of an image, for example.

SUMMARY

It is therefore an objective of the present invention to provide a method for enhancing images while maintaining metrological properties.

A further objective of the present invention is to provide a method for enhancing images obtained by mobile or static mapping platforms while maintaining metrological properties.

A further objective of the present invention is to provide a method for enhancing images obtained by mobile or static mapping platforms mapping urban environments while maintaining metrological properties.

These objectives are achieved by realizing the characterizing features of the independent claims. Features which further develop the invention in an alternative or advantageous manner are described in the dependent patent claims.

The invention relates to a method for enhancing images for metrological applications. A provided sensor image represents a scene of interest with initial metrological information for determining position and/or orientation of at least one object within the scene of interest. The sensor image has a sensor image geometric correctness. The sensor image is described by an image parameter provided by a scoring function evaluated on the sensor image, the image parameter in particular relating to brightness and/or noise and/or resolution and/or color fidelity and/or vividness of colors of the sensor image, the image parameter having an initial image parameter value. An enhanced image generated from the sensor image is also provided. The enhanced image is described by the image parameter having an enhanced image parameter value, the enhanced image parameter value in particular relating to higher brightness and/or reduced noise and/or higher resolution and/or higher color fidelity and/or more vivid colors than the sensor image. The enhanced image has a processed image geometric correctness, the processed image geometric correctness relating to distorted metrological information representing a loss of initial metrological information caused by an image processing with a neural network, the processed image geometric correctness being lower than the sensor image geometric correctness. The method further comprises the steps: 1) providing a geometric correction image having an image geometric correctness higher than the processed image geometric correctness and showing at least a part of the scene of interest, and 2) at least partially reducing the loss of initial metrological information in the distorted metrological information by fusing the enhanced image with the geometric correction image.

The scoring function may for example determine the SNR of an image to which it is applied, the image parameter in this case corresponding to SNR. The scoring function may also e.g. determine resolution, and/or brightness and/or color fidelity and/or vividness of colors and/or brightness of an image to which it is applied. The image parameter may be at least a part of the function output of the scoring function.

The scene of interest may be in an urban environment which is often characterized by narrow streets lined by tall buildings on either side blocking direct sunlight. Such urban environments are often dim, particularly before or after peak daylight conditions. The scene of interest may be a street in a city, for example, wherein the street is to be mapped. Views of a scene of interest in an urban environment may also be blocked from above, for example due to crowns of trees or due to protruding parts of buildings. The sensor image in the present invention preferentially captures (images) a scene of interest—in case the scene of interest lies in an urban environment—from a viewing position which is substantially of the same height as typical structures in the scene, for example buildings or trees. Since the sensor image—especially in urban environments—captures the scene of interest from a viewing position which is close to the scene of interest, structures in the urban environment in the sub-centimeter range are therefore typically mapped onto one pixel of an image sensor providing the sensor image.

A scene of interest, for example a street in an urban environment, may be mapped using a mobile mapping platform, for example a car-based mapping platform equipped with imaging devices configured to capture the scene of interest. Since car-based mapping systems are typically moving with speeds between 10 to 30 meters per second, the sensor image—the image sensor providing the sensor image for example mounted on the car-based mapping platform—may be captured with short exposure time to avoid a blurry image due to the movement of the car. Coupled with the dim environment often encountered in urban environments, the sensor image may be dark, wherein dark here refers to a qualitative statement made by a typical human observer of the sensor image. The sensor image may be perceived to be dark by a human observer. Such 'dark' images typically have a low SNR as well, for noise sources affecting image quality, e.g. thermal noise in an image sensor, are more pronounced in low-light imaging conditions as compared to imaging in broad daylight, for example.

Terrestrial laser scanning systems equipped with a digital camera, the digital camera capturing the sensor image, operating in dimly lit rooms may also capture 'dark' sensor images. Terrestrial laser scanning systems are typically stationary, i.e. they are typically fixed at a specific location.

The sensor image geometric correctness may correspond to a sensor image contrast, for example, or to a measure measuring deviations of edges in the sensor image from their true positions, for example, true positions in principle obtainable by perfect imaging without imaging errors. The sensor image may therefore have a low sensor image contrast. Image contrast may measure the difference between the highest and lowest intensity values of an image. A low sensor image contrast may imply that few easily discernible structures are visible in the sensor image. If the sensor image is a color image, sensor image contrast may be computed using the luminance computed from each pixel of the color image, for example.

The geometric correction image may also have a higher radiometric correctness than the sensor image. Higher radiometric correctness may arise in the case of inhomogeneities in the sensor image, e.g. due to recording settings of the camera acquiring the sensor image; the geometric correction image may be acquired in such a way that inhomogeneities in the geometric correction image are smaller than in the sensor image, in particular if the geometric correction image is acquired by an active imaging system such as a Lidar imaging system.

An image sensor providing the sensor image can at least partly be characterized by a mathematical camera model, e.g. a pinhole camera model, or an orthographic projection, or a scaled orthographic projection, or a paraperspective projection, or a perspective projection. A scene of interest is therefore typically distorted by the image sensor according to at least a combination of image sensor position and orientation, the spatial arrangement of the imaged scene of interest and the mathematical camera model describing the image sensor. Such a distortion may also be termed first projected distortion for the case of the sensor image.

Using at least the sensor image, metrological information such as the position of a house or car in an urban environment may be determined, for example. The sensor image is described by an image parameter, wherein the image parameter may in particular relate to the sensor image's brightness and/or noise level and/or resolution and/or color fidelity and/or color vividness. The value of the image parameter is determined by evaluating a scoring function on the sensor image, the evaluation providing an initial image parameter value. The scoring function may be e.g. embodied as a function computing SNR and/or brightness, or any other measurable property using an image as input. The image parameter may relate to any perceptible quality of the sensor image, too. The sensor image may be 'dark' and/or noisy and/or have low resolution and/or have low color fidelity and/or have low color vividness. Prior to further metrological processing it is beneficial to enhance the sensor image. For brightness enhancement, for example, state-of-the-art machine learning techniques, in particular neural networks, such as those by Chen et al. cited above may be used for this purpose. Since such machine learning techniques comprise knowledge about the task to be solved—obtained via a training process using input/output pairs of images, the input image corresponding to a 'dark' version of the 'bright' ground truth output image, for example—the enhancement provided by such machine learning techniques may increase the SNR of the sensor image to which the neural network is applied, for the processing provided by the neural network is non-linear. The neural network in general only needs to be trained on input/output pairs of images comprising a subset of images which may be recorded by sensors that are substantially similar to the image sensor. Substantial similarity is here understood in a statistical manner. The neural network may be trained using images characterized by a specific statistical distribution, wherein the specific statistical distribution is sufficiently close to the statistical distribution of images acquired by the image sensor. As long as this condition is fulfilled, the network may be trained using images which may be recorded by different image sensors than the image sensor. In case the neural network is trained to perform brightness enhancement, for example, the enhanced image is brighter than the sensor image, wherein brighter refers to a qualitative sensation as e.g. perceived by a typical human observer perceiving the brightness-enhanced image and the sensor image. In case the neural network is trained to increase a resolution of the sensor image, for example, the enhanced image has a higher resolution than the sensor image, wherein the neural network performs interpolation.

Vividness of a color may be defined in a hue-saturation-lightness (HSL) color space, for example. The vividness may be measured using the saturation component. A color becomes more vivid if moving out from the center of a HSL cylinder to the edge of the HSL cylinder, for example.

The enhancement of the sensor image provided by a machine learning technique specifically trained for enhancing the sensor image results in distortions in the enhanced image. The enhanced image has a processed image geometric correctness which is lower than the sensor image geometric correctness of the sensor image. During brightness enhancement by the neural network, for example, edges may be shifted, implying that edge information may be less reliable in the enhanced image as compared to the sensor image. In case the enhanced image is to be used for a subsequent triangulation of some object in the captured scene of interest or for coloring a point cloud, for example, properties such as the position of edges or corners of the object in the sensor image should ideally be maintained after image enhancement, i.e. the position of edges or corners of the object in the sensor image should ideally be the same both before and after image enhancement. State-of-the-art machine learning techniques for image enhancement, however, are only trained for enhancing images, for example increasing the brightness, and not for maintaining metrological properties of enhanced images.

According to the invention, a geometric correction image may be used for providing additional geometric information to the enhanced image to improve further metrological processing of the enhanced image. Since metrological applications such as triangulation from images typically require corresponding feature detection in at least two images, for example, and since detected features are typically edges or corners of objects in the images, it is vital for metrological processing of enhanced images to preserve such contour information. The geometric correction image may provide additional contour information to the enhanced image. The geometric correction image has an image geometric correctness which is higher than the processed image geometric correctness according to the invention. Edge information, for example, may be better represented by the geometric correction image than by the enhanced image.

According to the invention, the geometric correction image captures (includes) at least a part of the scene of interest captured by the sensor image. The geometric correction image may be provided with a second projected distortion of the captured at least part of the scene of interest. The second projected distortion may be similar to the first projected distortion. In case the geometric correction image is acquired by a different image sensor, for example, the different image sensor being distinct from the image sensor which may provide the sensor image, the sensor image and the geometric correction image may correspond to rectified images acquired by the image sensor and the different image sensor, wherein rectification denotes projection onto a common image plane. For such a rectified sensor image and geometric correction image, the first and second projected distortions would be the same.

The enhanced image and the geometric correction image are fused according to the invention. In case the first projected distortion and the second projected distortion are similar, for example, and at least a part of the scene of interest is jointly captured by the sensor image and the geometric correction image, fusing allows for a transfer of higher image geometric correctness information from the geometric correction image to the enhanced image. The enhanced image and the geometric correction image may be fused, for example, if the enhanced image and the geometric correction image are sufficiently correlated, i.e. if they image the same scene with similar distortions of the imaged scene.

The method according to the invention may be used for solving an assignment problem, wherein in the assignment problem two (or more) data sources may need to be related to one another. An example of the assignment problem is the coloring of a 3D point cloud using a color image, wherein the color values of individual pixels of the color image need to be related to 3D points of the 3D point cloud.

The fused image resulting from the fusion of the enhanced image and the geometric correction image may be used for metrological applications, for example for triangulation, wherein triangulation of an object captured in the fused image may be carried out using at least the fused image.

Besides geometric correctness, the invention may also be used for enhancing radiometric correctness. The radiometric correctness may be enhanced separately from the geometric correctness or together with the geometric correctness. The sensor image may have a sensor image radiometric correctness which—upon processing by a neural network—may deteriorate, i.e. a processed image radiometric correctness may be lower than the sensor image radiometric correctness. A radiometric correction image may then be used—in a structurally equivalent way to the use of a geometric correction image—to enhance the processed image by fusing the processed image with the radiometric correction image.

In an embodiment of the method, the sensor image is color-resolved, in particular obtained by a color-resolving camera with a Bayer pattern.

The sensor image may therefore be a RGB image.

In case the camera uses a Bayer pattern, the data provided by the camera may need to be pre-processed before feeding them to the neural network for image enhancement. The pre-processing may provide three separate RGB images of lower resolution than the originally captured Bayer image. The originally captured Bayer image may also be directly provided to the neural network.

In another embodiment of the method, the geometric correction image is generated using the sensor image by linear combination of color channels of the sensor image, in particular by applying a gamma expansion and/or histogram equalization to the color channels before the linear combination.

The geometric correction image may be obtained from the sensor image by linearly combining the color channels of the sensor image, providing a relative luminance. For a RGB color model, for example, the following linear combination of color channels may be carried out:

$$Y=0.2126R+0.7152G+0.0722B,$$

wherein Y denotes relative luminance, here the geometric correction image, and R, G, and B the red, green and blue components of the sensor image. Other linear combinations are feasible as well. The sensor image may be gamma-compressed by the image sensor. In this case, before linear combination to derive the relative luminance, the sensor image may be gamma-expanded. Linearly combining the different color channels to obtain a relative luminance image may improve the image contrast of the linearly combined image as compared to the image contrast present in the individual color channels. Metrological information, for example dependent on the detectability of object contours in the geometric correction image, may therefore be more easily extracted from the geometric correction image obtained from linearly combining the color channels of the sensor image than from the sensor image itself.

In another embodiment of the method, the geometric correction image is provided by a monochrome camera.

As a monochrome camera typically possesses a higher sensitivity than a color resolving camera due to missing color filters, images acquired by a monochrome camera typically have a higher SNR compared to e.g. RGB images. A geometric correction image acquired by the monochrome camera may therefore have a higher geometric correctness than a sensor image acquired by a RGB camera.

In another embodiment of the method, the geometric correction image is provided using a Lidar imaging system, wherein intensity of received electromagnetic pulses is used for deriving the geometric correction image.

The Lidar imaging system may be mounted on a car-based mapping platform, for example, to densely or sparsely map an urban environment. A Lidar imaging system emits measurement pulses, in particular electromagnetic measurement pulses, wherein the emitted measurement pulses are reflected from objects in the scene of interest. Reflected measurement pulses are subsequently received by the Lidar imaging system. The intensity of the received measurement pulses may then be determined. Based on such intensity information, the geometric correction image may be constructed by scanning the scene of interest with the Lidar imaging system. Depending on the scanning procedure carried out by the Lidar imaging system, the obtained raw intensity image may need to be re-gridded, potentially requiring interpolation, to obtain the geometric correction image. Alternatively, using the time of arrival of received measurement pulses, 3D information about the scanned scene of interest may be derived. The 3D point cloud obtained in such a way may be centrally projected onto a Lidar image plane, the Lidar image plane in particular corresponding to the sensor image plane corresponding to the sensor image. After central projection onto the Lidar image plane, the projected 3D point cloud data may be re-gridded to conform to the pixel grid of the sensor image.

Since a Lidar imaging system is an active imaging system, a high-contrast geometric correction image may be obtained in dim environments as well. The geometric correction image obtained by a Lidar imaging system may have a high geometric correctness.

The fusing may also provide a colorized 3D point cloud. Color information coming from the enhanced sensor image may be transferred to the 3D point cloud obtained with a Lidar imaging system.

The intensity values provided by a Lidar imaging system may also be used for defining the level of brightness of colors in the sensor image. This way, inhomogeneities in the sensor image arising from the position and orientation of the camera acquiring the sensor image and the surfaces of the captured objects (the color information of the captured object may appear differently in sensor images taken from different positions and orientations and camera settings) may be mitigated. Using the Lidar imaging system for setting the level of brightness of colors in the sensor image allows for a more homogeneous sensor image which can then be used for coloring the 3D point cloud acquired with the Lidar imaging system. Using the Lidar imaging system in such a way is an independent invention which can be carried out independently from the present invention.

In another embodiment of the method, the enhanced image is upsampled by the neural network, wherein a resolution of the upsampled enhanced image is higher than a resolution of the sensor image.

Higher resolution may pertain to the ratio between the size of the field of view which may be captured by the image sensor to the number of pixels used in the representation of the sensor image which may be provided by the image sensor.

In another embodiment of the method, the fusing uses panchromatic sharpening.

Panchromatic sharpening may be used for the fusion. Principal component analysis (PCA) based image fusion may also be used for the fusion, or wavelet or curvelet based fusion, or other transform domain image fusion techniques. A neural network may be used for fusion as well.

In another embodiment of the method, the fusing comprises the following steps: 1) forward converting the enhanced image to a different color model than the color model used for the enhanced image, providing a forward-converted enhanced image 2) defining an inverse conversion, wherein the inverse conversion is defined with respect to the forward conversion 3) providing a geometrically enhanced forward-converted enhanced image using the forward-converted enhanced image and the geometric correction image, and 4) applying the inverse conversion to the geometrically enhanced forward-converted enhanced image.

The fusion may be carried out in a different color space corresponding to a different color model compared to the color model in which the enhanced image is provided. Forward-converting the enhanced image to the different color space may allow for a better disentanglement of geometric information, for example encoded in illumination information, from other information encoded in the enhanced image. The forward-conversion possesses an inverse transform, here termed inverse conversion. The forward-converted enhanced image and the geometric correction image may then be combined to obtain a geometrically enhanced forward-converted enhanced image. To return to the color model in which the enhanced image is provided, the inverse conversion may be applied to the geometrically enhanced forward-converted enhanced image.

In another embodiment of the invention, the different color model is a hue-saturation-value (HSV) color model.

In a HSV color model, the value component comprises illumination information. Edge information, for example needed for triangulation requiring edge feature detectors, is mostly stored in the value component.

In another embodiment of the method, geometric enhancement is provided by computing a pointwise linear combination between the value component of the forward-converted enhanced image and the geometric correction image, wherein both the forward-converted enhanced image and the geometric correction image are provided in a grid representation, and the pointwise linear combination is computed between corresponding grid elements.

The value component of a HSV color model may comprise the geometric information needed for subsequent metrological applications. The geometric correction image having higher geometric correctness may be combined with the value component of the forward-converted enhanced image through a pointwise linear combination operation. Besides linearly combining in a pointwise manner, any other functional relationship between the value component of the geometrically enhanced forward-converted enhanced image and the value component of the forward-converted enhanced image and the geometric correction image is feasible as well.

Fusion may be carried out in pointwise fashion, wherein each pixel of the forward-converted enhanced image may be fused with the corresponding pixel from the geometric correction image.

In another embodiment of the method, geometric enhancement is provided by replacing the value component of the forward-converted enhanced image with the geometric correction image.

In another embodiment of the method, the fusing corrects geometric errors present in the enhanced image, wherein geometric errors correspond to displacement errors introduced into the sensor image by the enhancement provided by the neural network, wherein displacement errors refer to the displacement of corresponding points between the sensor image and the enhanced image.

The enhancement provided by the neural network may introduce geometrical distortions to the image on which it operates. Using the geometric correction image, the fusion according to the present invention advantageously may at least partly compensate such introduced geometrical distortions. The resulting image after fusion may therefore have both a higher SNR (via non-linear enhancement provided by the trained neural network) as well as more faithful geometric information needed for subsequent metrological applications carried out on the fused image.

The invention also relates to a computer program product with program code being stored on a machine readable medium or embodied as an electromagnetic wave, the program code being configured to provide image enhancement as in the method according to the invention.

The invention also relates to an image processing system comprising a computing unit, a computer program product with program code according to the invention being stored on the computing unit, and at least one image sensor providing at least one image to the computing unit, wherein the image processing system is configured to carry out the image enhancement method.

The invention also relates to an image processing system according to the invention, wherein the image processing system is specifically configured for being part of a car-based mapping platform or of a rail-based mapping platform or of a mapping platform carried by a user or of a static mapping platform.

A mobile mapping platform may map a scene of interest, for example a street in an urban environment. The mobile mapping platform may be equipped with a RGB camera acquiring the sensor image and a monochrome camera acquiring the geometric correction image, for example. The sensor image may be enhanced using a machine-learning based technique and subsequently fused with the geometric correction image. Besides operating on a single sensor image, enhancement may also jointly be carried out on a sequence of sensor images. Fusion of a geometric correction image sequence with the corresponding enhanced image sequence may be carried out sequence element by sequence element.

A static mapping platform may for example be embodied by a terrestrial laser scanning system comprising a color resolving camera and a laser scanner. The color resolving camera may provide the sensor image, and the laser scanner may provide the geometric correction image. Examples of mobile mapping platforms are the Leica Pegasus 2 or the Pegasus backpack. Examples of terrestrial laser scanners are the Leica RTC360 or the Leica BLK360. Laser trackers such as the Leica ATS600 may also be used. The Leica BLK2GO is an example of a mapping platform carried by a human user. Total stations (total station positioning system, especially those with scanning functionality, such as the Total Station Leica Nova MS60), coordinate measurement machines and articulated arms can be used as well.

Image sensors may be mounted on the mobile or static mapping platform in such a way that the relative geometric arrangement between the mounted image sensors is known. The mounted image sensors may be calibrated as well.

Using the method according to the invention, metrological applications may be carried out using images provided by cheaper image sensors than typically used, for 'dark' and low SNR images, for example, may be at least partly 'corrected' through the combined use of image brightness enhancement provided by a neural network and geometric enhancement provided by fusing the brightness-enhanced image with a separate image.

BRIEF DESCRIPTION OF THE DRAWINGS

The inventive system is described below in more detail purely by way of example with the aid of concrete exemplary embodiments illustrated schematically in the drawings, further advantages of the invention also being examined. Identical elements are labelled with the same reference numerals in the figures. In detail.

DETAILED DESCRIPTION

Figure 1:
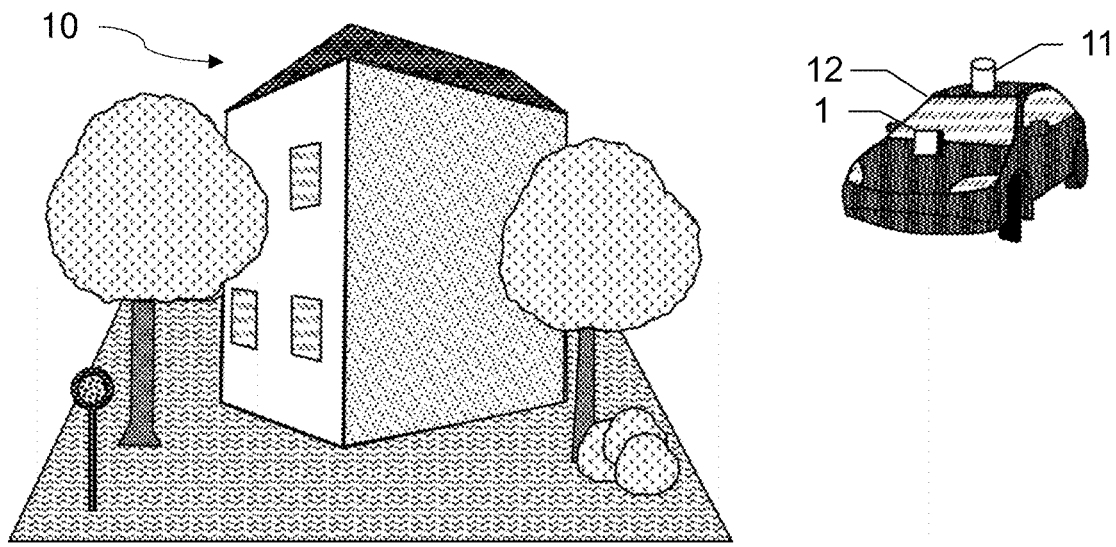
FIG. 1 shows an embodiment of the invention used for mapping a scene of interest with a car-based mobile mapping platform.

FIG. 1 shows an embodiment of the invention used for mapping a scene of interest 10 with a car-based mobile mapping platform 12. An RGB camera 1 and a Lidar imaging system 11 are mounted onto a car. The car may be continuously moving while acquiring the environment. A car-based mobile mapping platform 12, for example, may typically be moving with velocities between 10-30 meters per second. Rail-based systems may be used for mapping as well. A mobile mapping system may also be carried by a human. Such hand-held mobile mapping systems may have lower speeds of locomotion and greater dynamics such as rotational speeds than car- or rail-based systems. The Lidar imaging system 11 and the RGB camera 1 may have a known position and orientation to one another in order to allow for image rectification, for example. The car-based mobile mapping platform 12 may drive through narrow streets in urban environments, mapping the environment it drives through. One metrological application might be to obtain a dense 3D reconstruction of an urban scene of interest 10. The dense 3D reconstruction should comprise both an actual 3D reconstruction, i.e. location information of imaged surfaces in a 3D coordinate system, but also color information associated to said image surfaces. Using the method according to the present invention, dark and low SNR color images provided by the RGB camera 1 may be geometrically enhanced using the geometric correction image provided by the Lidar imaging system 11, for example, while color information is provided by the enhanced image provided by a neural network.

Figure 2:
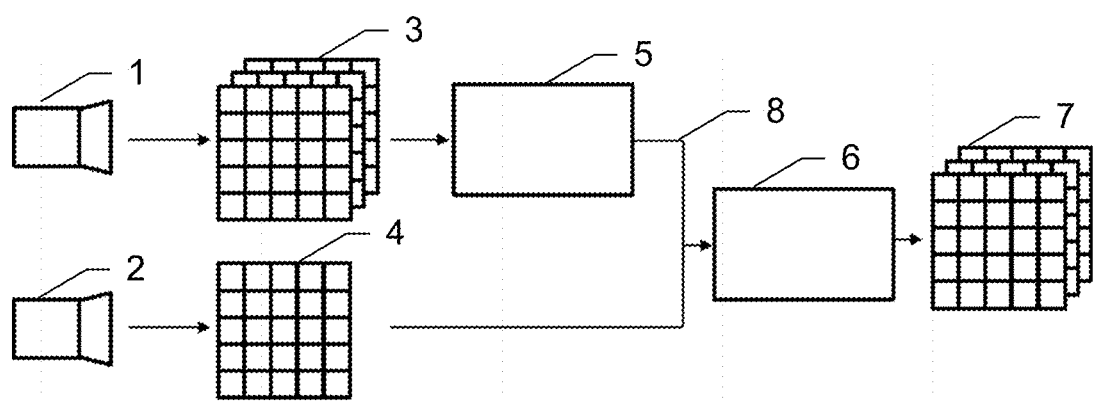
FIG. 2 shows an embodiment of the method according to the invention.

FIG. 2 shows an embodiment of the method according to the invention. An RGB camera 1 and a monochrome camera 2 provide images. The RGB camera 1 provides a sensor image. The RGB camera 1 may provide a noisy three-channel RGB image 3 after pre-processing the raw RGB camera 1 output, wherein the noisy three-channel RGB image 3 may be taken with a short exposure time in order to avoid motion blur or the noisy three-channel RGB image 3 may be taken in a dim environment. Due to a higher sensitivity of the monochrome camera 2, the geometric correction image 4 provided by the monochrome camera 2 comprises better geometric information. Due to the potentially low signal-to-noise ratio of the noisy three-channel RGB image 3, an enhancement algorithm 5 operating on the noisy three-channel RGB image 3 is preferentially non-linear in its input. The enhancement algorithm may comprise a convolutional neural network (CNN), wherein the CNN may be trained for regression purposes. The CNN may be trained to learn a mapping between a dark and a bright image of the same scene, for example, so that upon receiving a dark image as input, the CNN may transform it to be brighter. The CNN may therefore learn to denoise, color-transform, demosaic and to enhance a dark and noisy input image. As a CNN is partly a black-box model, it may introduce geometric distortions in the three-channel RGB enhanced image 8.

Such geometric distortions are removed through the use of additional information provided by the monochrome camera 2, wherein the needed geometric information may be provided by the geometric correction image 4. The three-channel RGB enhanced image 8 and the geometric correction image 4 provided by the monochrome camera 2 are fused 6, for example through panchromatic sharpening. The overall three-channel RGB image 7 provided by the method is geometrically faithful and has a good color resolution. In its processed form 7, it is more amenable for further metrological processing than the dark and noisy three-channel RGB image 3 directly provided by the RGB camera 1 after pre-processing.

Figure 3:
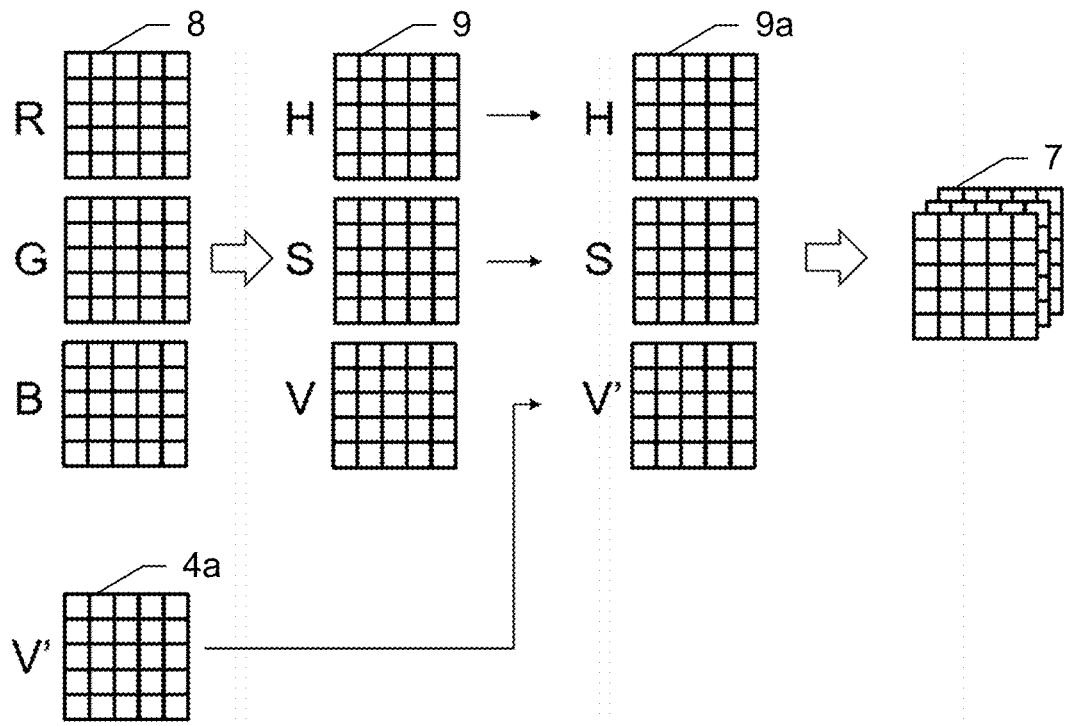
FIG. 3 shows an embodiment of the fusion according to the invention.

FIG. 3 shows an embodiment of the fusion according to the invention. A three-channel RGB enhanced image 8 is forward-converted to a different color model, in particular a hue-saturation-value (HSV) color model. In the exemplary embodiment of FIG. 2, the value component of the forward-transformed three-channel RGB enhanced image 9 is replaced by a different value component 4a, in particular provided by the geometric correction image. After deriving the geometrically enhanced forward-transformed three-channel RGB enhanced image 9a, the inverse conversion to the forward conversion may be carried out, yielding the desired three-channel RGB image 7. The value component 4a may provide accurate geometric information, while the three-channel RGB enhanced image 8 may provide color information not comprised by the different value component 4a, in particular the geometric correction image.

Figure 4:
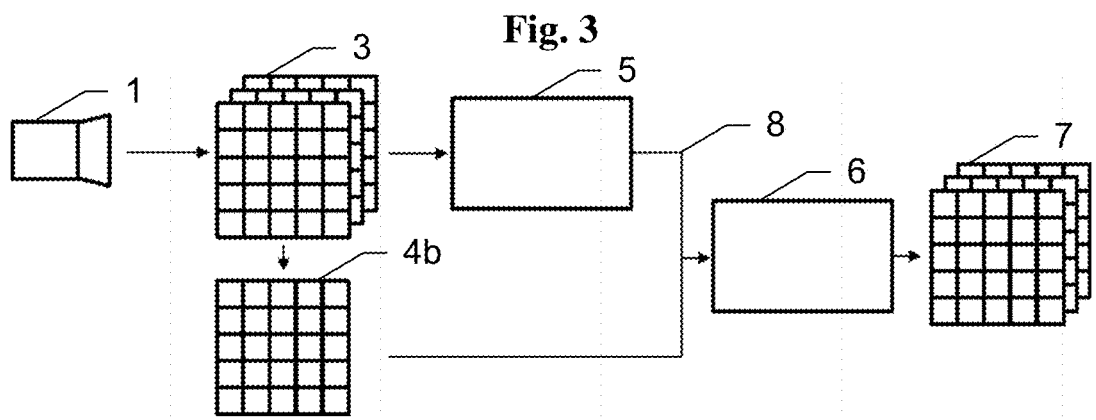
FIG. 4 shows an embodiment of the method according to the invention.

FIG. 4 shows an embodiment of the invention for image enhancement. An RGB camera 1 provides a noisy three-channel RGB image 3 of a scene of interest. The noisy three-channel RGB image 3 may have a large amount of noise as the image may be taken in a dim environment. Due to a potential movement of the RGB camera 1, it may be necessary to have a short exposure time as well. The dark and noisy three-channel RGB image 3 may be enhanced through the combination of an algorithm comprising a convolutional neural network (CNN) 5, the CNN providing brightness enhancement, for example, and panchromatic sharpening 6 providing fusion. For the fusing, a lower noise one-channel intensity image 4b may be derived from the noisy three-channel RGB image 3. The one-channel intensity image 4b may be fused with the three-channel RGB enhanced image 8. The noisy three-channel RGB image 3 may be enhanced by a trained machine learning algorithm 5 comprising a CNN, wherein the CNN may be trained on input/output pairs of RGB images, wherein the input images may comprise noisy and dark images of the scene of interest, and the output images may comprise corresponding images that are brighter and less noisy, for example. The CNN may be trained in such a way as to learn the mapping from input to output images, for example. Due to the black-box nature of the CNN, geometric distortions may be present in the three-channel RGB enhanced image 8. The fusion 6 may aim at removing such distortions by using geometrically more faithful information 4b. The three-channel RGB image 7 provided by the fusion may be both enhanced as well as geometrically correct, wherein the potential geometric distortions of the machine learning algorithm 5 may be mitigated by the separate hard-coded fusion 6.

Figure 5:
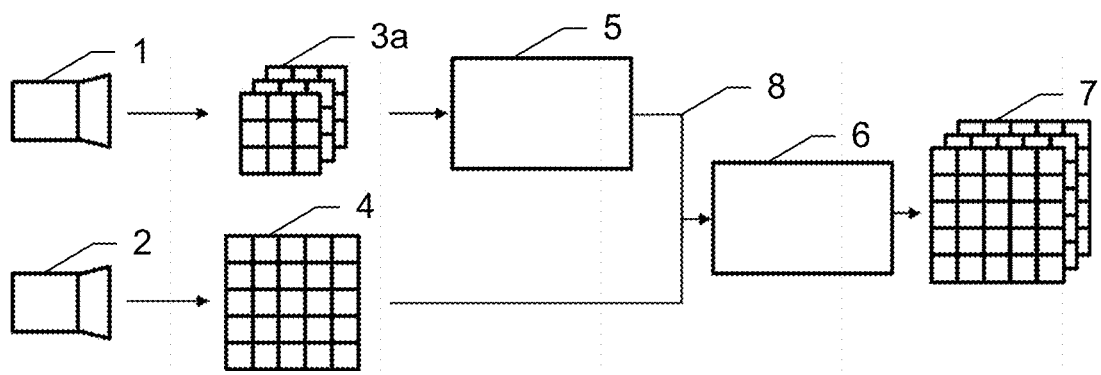
FIG. 5 shows an embodiment of the method according to the invention.

FIG. 5 shows an embodiment of the method according to the invention. An RGB camera 1 may provide a low-resolution three-channel RGB image 3a. An additional monochrome camera 2 with high sensitivity may provide a one-channel intensity image of higher resolution, the geometric correction image 4. The algorithm comprising a convolutional neural network (CNN) 5 used for enhancing the low-resolution three-channel RGB image 3a provided by the RGB camera 1 may in this embodiment comprise upsampling functionality. For the fusion 6, it may be beneficial if both the three-channel RGB enhanced image 8 as well as the geometric correction image 4 provided by the monochrome camera 2 have the same image resolution. After enhancement, in this case upsampling, through the algorithm comprising a CNN 5, the upsampled three-channel RGB enhanced image 8 and the monochrome image 4 are fused 6, for example through the use of panchromatic sharpening, finally providing a higher resolution three-channel RGB image 7 as output. The neural network providing upsampling may also provide brightness enhancement and/or noise reduction and/or it may increase color fidelity and/or it may make colors more vivid in combination with the upsampling.

Figure 6:
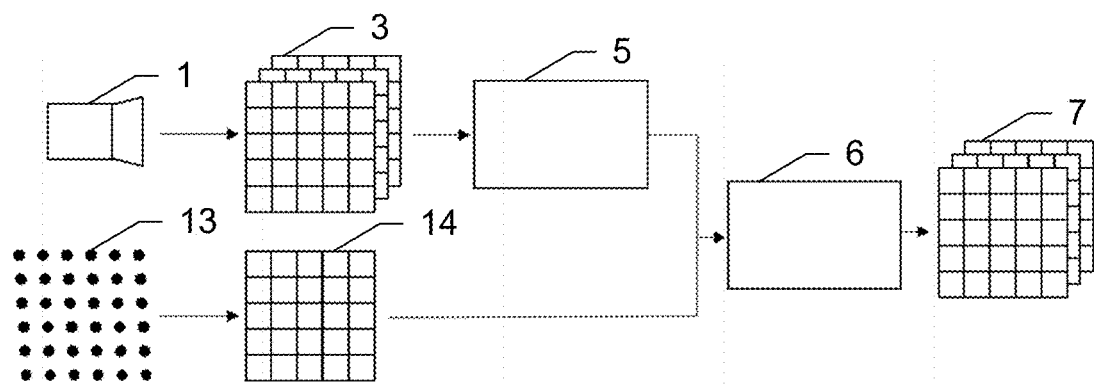
FIG. 6 shows an embodiment of the method according to the invention.

FIG. 6 shows an embodiment of the method according to the invention. The sensor image 3 is provided by a RGB camera 1. A Lidar imaging system imaging at least a part of the scene of interest captured by the RGB camera 1 provides intensity values 13 of received electromagnetic pulses. The intensity values 13 may be re-gridded into a grid representation, the grid representation being the geometric correction image 14. Besides using intensity values, alternatively the 3D position of points in a 3D point cloud recorded by the Lidar imaging system may be centrally projected onto a Lidar image plane, the projected and potentially re-gridded image being the geometric correction image. The sensor image 3 is then enhanced by a neural network 5, the enhanced image being then fused 6 with the geometric correction image 14. The fusion 6 provides an enhanced and geometrically faithful image 7.

Figure 7:
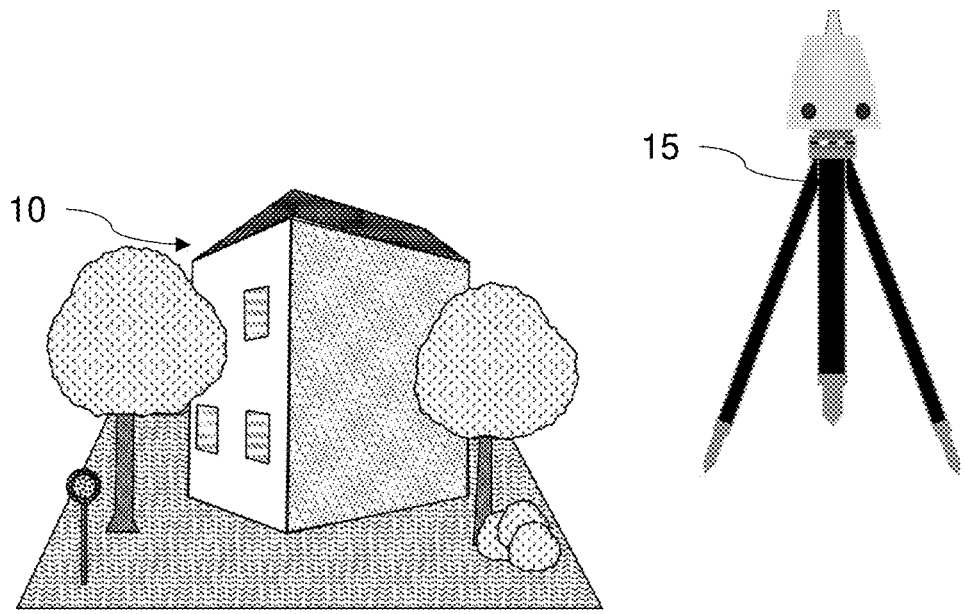
FIG. 7 shows an embodiment of the invention used for mapping a scene of interest with a laser scanner on a tripod.

FIG. 7 shows an embodiment of the invention used for mapping a scene of interest 10 with a terrestrial laser scanner 15 on a tripod or total station positioning system. The terrestrial laser scanner 15 on a tripod is equipped with a RGB camera acquiring the sensor image. The sensor image is enhanced by a neural network, and a 3D point cloud provided by the laser scanner is converted into the geometric correction image. The enhanced image and the geometric correction image are fused. The scene of interest 10 may be a dimly lit urban environment or a dimly lit indoor room, for example.

Figure 8:
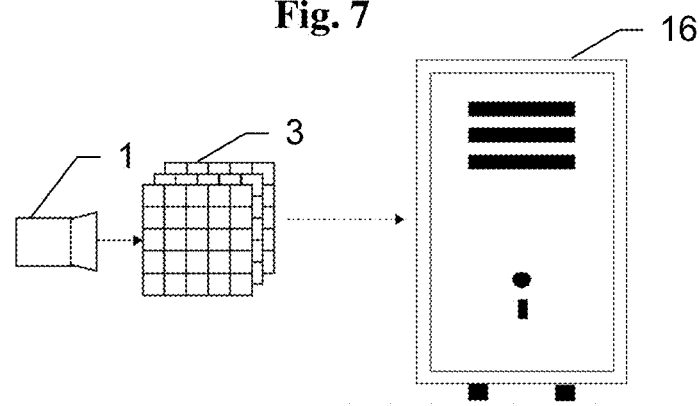
FIG. 8 shows an image processing system according to the invention.

FIG. 8 shows an image processing system according to the invention. The image processing system comprises a computing unit 16 on which a computer program providing image enhancement according to the invention may be stored and executed. The computer program receives input from a RGB camera 1 providing the sensor image 3. Alternatively, additional input may be provided to the computer program, for example images provided by a monochrome camera or a Lidar imaging system.

Image enhancement and fusing may take place on-site on the measurement device, or off-site after exporting raw or pre-processed data from the measurement device. The raw measurement data may for example be transmitted to a cloud service computing the enhanced and geometrically faithful image.

It goes without saying that these figures illustrated are merely schematics of possible exemplary embodiments.

Although the invention is illustrated above, partly with reference to some preferred embodiments, it must be understood that numerous modifications and combinations of different features of the embodiments can be made. All of these modifications lie within the scope of the appended claims.

The invention claimed is:

1. Method for enhancing images for metrological applications comprising:
   acquiring a sensor image
      representing a scene of interest with initial metrological information for determining position or orientation of at least one object within the scene of interest,
      having a sensor image geometric correctness, wherein the geometric correctness corresponds to a measure of deviations of edges and
      being described by an image parameter provided by a scoring function evaluated on the sensor image, the image parameter in particular relating to brightness or noise or resolution or color fidelity or vividness of colors of the sensor image, the image parameter having an initial image parameter value,
   generating an enhanced image from the sensor image
      being described by the image parameter having an enhanced image parameter value, the enhanced image parameter value in particular relating to higher brightness or reduced noise or higher resolution or higher color fidelity or more vivid colors than the sensor image, and
      having a processed image geometric correctness, the processed image geometric correctness relating to distorted metrological information representing a loss of initial metrological information caused by an image processing with a neural network, the processed image geometric correctness being lower than the sensor image geometric correctness,
   acquiring a geometric correction image
      having an image geometric correctness higher than the processed image geometric correctness,
      showing at least a part of the scene of interest,
   at least partially reducing the loss of initial metrological information in the distorted metrological information by fusing the enhanced image with the geometric correction image.

2. Method according to claim 1, wherein the sensor image is color-resolved and obtained by a color-resolving camera with a Bayer pattern.

3. Method according to claim 2, wherein the geometric correction image is generated using the sensor image by linear combination of color channels of the sensor image, by applying a gamma expansion and/or histogram equalization to the color channels before the linear combination.

4. Method according to claim 1, wherein the geometric correction image is provided by a monochrome camera.

5. Method according to claim 1, wherein the geometric correction image is provided using a Lidar imaging system, wherein intensity of received electromagnetic pulses is used for deriving the geometric correction image.

6. Method according to claim 1, wherein the enhanced image is upsampled by the neural network, wherein a resolution of the upsampled image is higher than a resolution of the sensor image.

7. Method according to claim 1, wherein the fusing uses panchromatic sharpening.

8. Method according to claim 7, wherein the fusing comprises the following steps:
- forward converting the enhanced image to a different color model than the color model used for the enhanced image, providing a forward-converted enhanced image,
- defining an inverse conversion, wherein the inverse conversion is defined with respect to the forward conversion,
- providing a geometrically enhanced forward-converted enhanced image using the forward-converted enhanced image and the geometric correction image, and
- applying the inverse conversion to the geometrically enhanced forward-converted enhanced image.

9. Method according to claim 8, wherein the different color model is a hue-saturation-value (HSV) color model.

10. Method according to claim 9, wherein geometric enhancement is provided by computing a pointwise linear combination between the value component of the forward-converted enhanced image and the geometric correction image, wherein both the forward-converted enhanced image and the geometric correction image are provided in a grid representation, and the pointwise linear combination is computed between corresponding grid elements.

11. Method according to claim 9, wherein geometric enhancement is provided by replacing the value component of the forward-converted enhanced image with the geometric correction image.

12. Method according to claim 1, wherein the fusing corrects geometric errors present in the enhanced image, wherein geometric errors correspond to displacement errors introduced into the sensor image by the enhancement provided by the neural network, wherein displacement errors refer to the displacement of corresponding points between the sensor image and the enhanced image.

13. Computer program product with program code being stored on a non-transitory machine readable medium, the program code being configured to provide image enhancement as in the method of claim 1.

14. Image processing system comprising a computing unit, a computer program product with program code according to claim 1 being stored on the computing unit, and at least one image sensor providing at least one image to the computing unit, wherein the image processing system is configured to carry out the image enhancement method.

15. Image processing system according to claim 14, wherein the image processing system is specifically configured for being part of a car-based mapping platform or of a rail-based mapping platform or of a mapping platform carried by a user or of a static mapping platform.

* * * * *